US011631934B2

United States Patent
Parekh

(10) Patent No.: US 11,631,934 B2
(45) Date of Patent: Apr. 18, 2023

(54) INTEGRATED NFC ANTENNA IN TOUCH LAYER

(71) Applicant: Google LLC, Mountain View, CA (US)

(72) Inventor: Premal Parekh, Milpitas, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 17/382,861

(22) Filed: Jul. 22, 2021

(65) Prior Publication Data
US 2022/0052444 A1    Feb. 17, 2022

Related U.S. Application Data

(60) Provisional application No. 63/064,590, filed on Aug. 12, 2020.

(51) Int. Cl.
*H01Q 1/38* (2006.01)
*H01Q 1/27* (2006.01)
*H01Q 1/42* (2006.01)
*H01Q 1/22* (2006.01)

(52) U.S. Cl.
CPC ........... *H01Q 1/273* (2013.01); *H01Q 1/2283* (2013.01); *H01Q 1/38* (2013.01); *H01Q 1/422* (2013.01)

(58) Field of Classification Search
CPC ........ H01Q 1/273; H01Q 1/2283; H01Q 1/38; H01Q 1/422
USPC .......................................................... 343/702
See application file for complete search history.

(56) References Cited

U.S. PATENT DOCUMENTS

| | | |
|---|---|---|
| 2014/0043248 A1 | 2/2014 | Yeh et al. |
| 2015/0062853 A1 | 3/2015 | Li et al. |
| 2015/0282293 A1 | 10/2015 | Lim et al. |
| 2019/0067803 A1* | 2/2019 | Kang ................... G04G 21/025 |
| 2021/0019005 A1* | 1/2021 | Chen ...................... G06F 3/047 |

* cited by examiner

*Primary Examiner* — Peguy Jean Pierre
(74) *Attorney, Agent, or Firm* — Lerner, David, Littenberg, Krumholz & Mentlik, LLP

(57) ABSTRACT

The present disclosure provides for an example stack of components for a display of a wearable device. The stack may include a first metal layer, a second metal layer, and an insulation layer separating the first and second metal layers. The first metal layer may be configured to be a touch screen and the second metal layer may be configured to be a near field communication antenna. The first metal layer may be connected to a first integrated circuit chip and the second layer may be connected to a second integrated circuit chip such that the touch sensor and the NFC antenna are on different circuits.

20 Claims, 3 Drawing Sheets

INTEGRATED NFC ANTENNA IN TOUCH LAYER

CROSS-REFERENCE TO RELATED APPLICATIONS

This application claims the benefit of the filing date of U.S. Provisional Patent Application No. 63/064,590 filed Aug. 12, 2020, the disclosure of which is hereby incorporated herein by reference.

BACKGROUND

Wearable devices, such as smartwatches, typically include a touch screen for receiving an input command from a user and a near field communication ("NFC") antenna. Input to the touch screen is detected by a touch sensor, which is part of a stack of components for the display. The stack often includes two metal layers. The first metal layer includes rows and columns of electrodes that are connected by the second metal layer, which acts as jumpers. The NFC antenna is a separate component within the wearable device. As more components are included in the wearable device, it can become large, bulky, and uncomfortable for the user to wear.

BRIEF SUMMARY

The present disclosure provides an improved stack of display components for a wearable electronic device, which reduces the overall size of the device by integrating the NFC antenna into one of the metal layers in the stack. For example, the stack may include a first metal layer and a second metal layer, where the first metal layer may be a touch sensor and the second metal layer is the NFC antenna.

One aspect of the disclosure includes a wearable device comprising a housing having a cavity adapted to hold a plurality of components and a stack of display components within the cavity. The stack may include a first metal layer extending at least partially across a width of the housing and coupled to a first integrated circuit chip; a second metal layer extending at least partially around a perimeter of the housing and coupled to a second integrated circuit chip, wherein the second metal layer is defined by an outer edge and an inner edge and an insulation layer between the first metal layer and the second metal layer. The first metal layer may be configured as a touch sensor. The second metal layer may be configured as an antenna. The antenna may be a near field communication antenna.

The first metal layer is not directly electrically connected to the second metal layer. The first integrated circuit chip may be a touch integrated circuit chip and the second integrated circuit chip is a near field communication chip.

The first metal layer may be a touch sensor and the second metal layer may be a near field communication antenna, and wherein the touch sensor may be coupled to a first plurality of electrodes and the near field communication antenna may be coupled to a second plurality of electrodes. The first plurality of electrodes may be routed through the first metal layer to the first integrated circuit chip and the second plurality of electrodes may be routed around the perimeter of the housing to the second integrated circuit chip.

The display may be an organic light-emitting diode ("OLED") display. The insulation layer may be an interlayer dielectric. The wearable device may be a smartwatch. The first metal layer may comprise a plurality of islands. The second metal layer may form a coil around the perimeter of the housing.

Another aspect of the disclosure includes a stack of display components for an electronic device. The stack may comprise a first metal layer defined by a perimeter, the first metal layer being configured as a touch sensor and coupled to a first integrated circuit and a second metal layer configured as a near field communication antenna and coupled to a second integrated circuit. The second metal layer may be defined by an outer edge and an inner edge, the outer edge being aligned with the perimeter of the first metal layer, and the first and second metal layers may be separated by an insulation layer.

Yet another aspect of the disclosure includes a stack of display components for an electronic device. The stack may comprise a first metal layer including a plurality of islands, each island of the plurality of islands coupled to a first integrated circuit chip by one of a plurality of electrodes, wherein the electrodes are routed through the first metal layer, a second metal layer coupled to a second integrated circuit chip coupled to a second integrated circuit chip by one or more electrodes, and an insulation layer positioned between the first metal layer and the second metal layer.

DETAILED DESCRIPTION

A wearable device may include a display and a touch screen allowing users to interact with the display. For example, the touch screen may receive input commands from a user, wherein a touch sensor included in the wearable device detects the input commands. The touch sensor and display and other components enabling the touch screen functionality are typically layered in a display stack. The wearable device may further include a wireless communication interface, including, for example, an antenna such as a Wi-Fi antenna, a Bluetooth antenna, an NFC antenna, etc. As disclosed herein, the antenna may be integrated into the display stack, as opposed to existing as a separate component elsewhere in the device, thereby decreasing the overall size of the wearable device.

The display stack may include at least two metal layers. The first metal layer may be configured as the touch sensor and the second metal layer may be configured as the NFC antenna. The first metal layer may include one or more portions, or "islands". The islands may be pieces of metal that are distributed across a horizontal plane. While described as metal, the islands or first metal lay may be made of any conductive material. According to some examples, the islands may form a pattern, such as a grid pattern. The totality of the plurality of islands may create the first metal layer. The islands are not connected to each other by the second metal layer. Instead, each island is connected directly to a first integrated circuit ("IC") or integrated circuit chip.

The second metal layer is not electrically connected to the first metal layer. The second metal layer is directly connected to a second IC instead of being configured to connect the islands of the first metal layer. According to some examples, the wearable electronic device may be self-capacitance sensing and, therefore, does not require the second metal layer to be configured as jumpers to connect the islands of the first metal layer. Instead, each island of the first metal layer is directly connected to a first IC. The first IC may be a touch IC and the second IC may be an NFC IC such that the touch sensor and the NFC antenna each have their own circuit.

Figure 1:
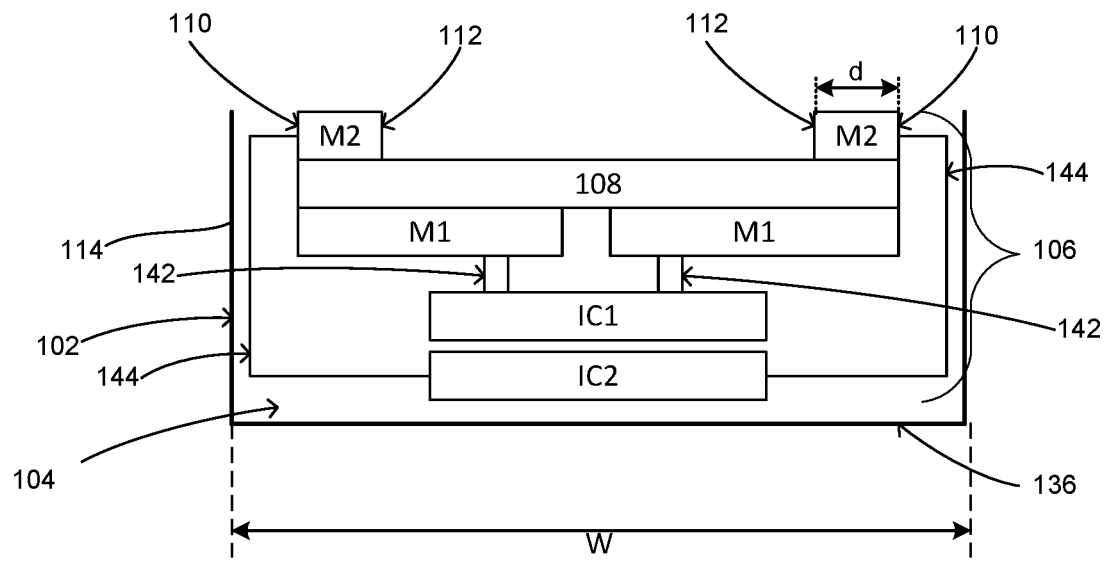
FIG. 1 is a cross-sectional view of an example stack of components within a housing according to aspects of the disclosure.

FIG. 1 illustrates a cross section of a plurality of components within a stack of display components for a wearable device. The wearable device may include a housing 102 having a width "W." The housing 102 may have a cavity 104 for holding the plurality of components. The plurality of components may include, for example, a stack 106 of display components for the display. The wearable device may include other electronic components, such as one or more processors, memory, data, instructions, etc. within housing 102. The stack, or stack-up, may be a plurality of components for the display such that each component is one layer in the stack. Each component, or layer, in the stack may lie within a respective plane. The plane may be parallel or substantially parallel to a first surface 136 of housing 102. While the stack is shown as horizontal and parallel to the first surface 136, the stack does not have to be horizontal as some components may have bends or curves to fit within housing 102. Additionally or alternatively, some layers or components may overlap. Thus, the configuration of stack 106, as shown, is merely one example and is not intended to be limiting.

The stack 106 may include a first metal layer "M1," a second metal layer "M2," and an insulation layer 106 positioned between the first and second metal layers M1, M2.

According to one example, the first metal layer M1 may be a continuous metal layer. In other examples, the first metal layer M1 is a plurality of islands, such as portions of the metal layer that are separated by some distance. Each island may be aligned such that the plurality of islands that make up the first metal layer M1 are within the same horizontal plane.

The first metal layer M1 may be directly connected to a first integrated circuit chip "IC1." For example, a first plurality of electrodes 142 may extend from each island to the first integrated circuit chip ICE The first plurality of electrodes may be routed through the first metal layer M1.

The second metal layer M2 may form a coil around a perimeter 114 of the housing 102. For example, the second metal layer M2 may have an outer edge 110 and an inner edge 112. The outer edge 110 may be located at or near the perimeter 114 of the housing 102. The inner edge 112 may be located a distance "d" from the outer edge 110 such that the inner edge 112 may be closer to the center of the housing 102 than it is to the perimeter 114.

The second metal layer M2 may be directly connected to the second integrated circuit chip "IC2." For example, the second metal layer M2 may have a circuit separate and/or distinct from the circuit of the first metal layer M1.

The wearable device may include a second plurality of electrodes 144 extending between the second metal layer M2 and the second integrated circuit chip IC2. The second plurality of electrodes 144 may be routed through the second metal layer M2 to the second integrated circuit chip IC2.

According to some examples, the second plurality of electrodes 144 may be routed around the perimeter 114 of housing 102.

The first and second metal layer M1, M2 may be separated by an insulation layer 108. The insulation layer 108 may be an inter-layer dielectric or a non-conductive material. For example, the insulation layer may be made of silica, hafnium silicate, zirconium silicate, etc. According to some examples, the insulation layer 108 may fill the space between each of the islands of the first metal layer M1.

The first and second layers M1, M2 are not electrically coupled together. For example, each of the first and second metal layers M1, M2 are directly connected to the first and second integrated circuit chip IC1, IC2, respectively, as opposed to one layer functioning as a jumper. The wearable device may be a self-capacitance sensing device and, therefore, does not require the second metal layer to be configured as jumpers to connect the islands of the first metal layer.

According to some examples, the first metal layer M1 may be a touch sensor and the second metal layer M2 may be an NFC antenna. The touch sensor may extend throughout the area of the display defined by the perimeter 114 of the housing 102 and the NFC may be located at or near the perimeter 114 of the housing 102. The first integrated circuit chip IC1 may be a touch IC and the second integrated circuit chip IC2 may be an NFC IC. This may ensure that the NFC antenna is on a different circuit than the touch sensor.

Using the second metal layer M2 as an NFC antenna may decrease the mechanical complexity of the device. For example, by connecting the first metal layer M1 directly to the first integrated circuit chip IC1, the second metal layer M2 is no longer configured to be a jumper between the islands of the first metal layer M1. Instead, the second metal layer M2 may be repurposed as the NFC antenna. To do so, the second metal layer M2 may be positioned at or near the perimeter 114 of the device. This may reduce the number of components within the device, which may decrease the complexity of the electrical components. Additionally or alternatively, repurposing the second metal layer as the NFC antenna may decrease the size of the device by no longer needing a separate and/or additional component for the NFC antenna. In some examples, this may decrease the cost to manufacture due to the decrease in parts and complexity.

While the first metal layer M1 is shown as being positioned in a layer of the stack 106 closer to the first surface 136 of housing 102, the order of the layers in the stack 106 may change. Therefore, the configuration of the stack 106 in FIG. 1 is merely one example and is not intended to be limiting.

Figure 2:
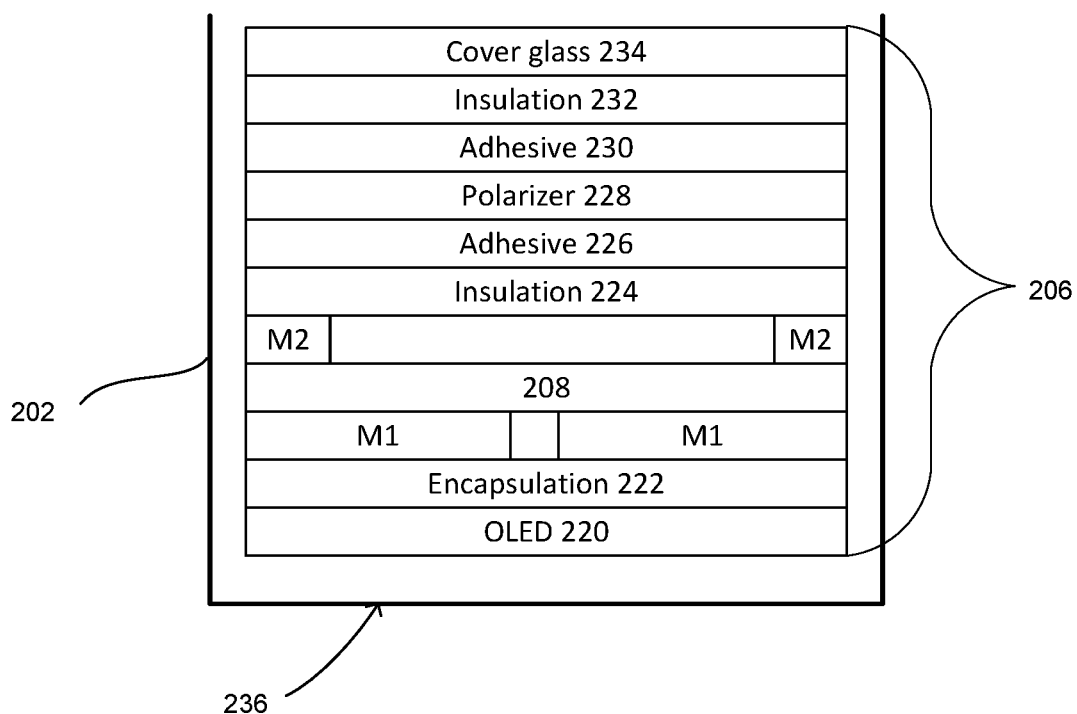
FIG. 2 is a cross-sectional view of stack of FIG. 1 with additional components within a housing according to aspects of the disclosure.

FIG. 2 illustrates a cross-sectional view of the stack of FIG. 1 with additional components. While the components in the stack 206 are shown in a specific order, the order of the components may be changed and, therefore, the order shown is merely one example and is not intended to be limiting. Additionally or alternatively, there may be more or less components than those shown.

The stack 206 may be located within housing 202. The housing 202 may have a first surface 236 configured to be placed on the body of a user. Opposite, or substantially opposite the first surface, may be a second surface intended to receive the touch input of a user. The second surface may be cover glass 234. Between the first surface 236 and cover glass 234 may be organic light emitting diode ("OLED") 220, encapsulation layer 222, the first metal layer M1, insulation layer 208, the second metal layer M2, insulation layer 224, adhesive 226, polarizer 228, adhesive 230, and insulation 232. The insulation layers 208, 224, 232 may made of an inter-layer dielectric. The adhesive layers 226, 230 may be an optically clear adhesive.

Figure 3:
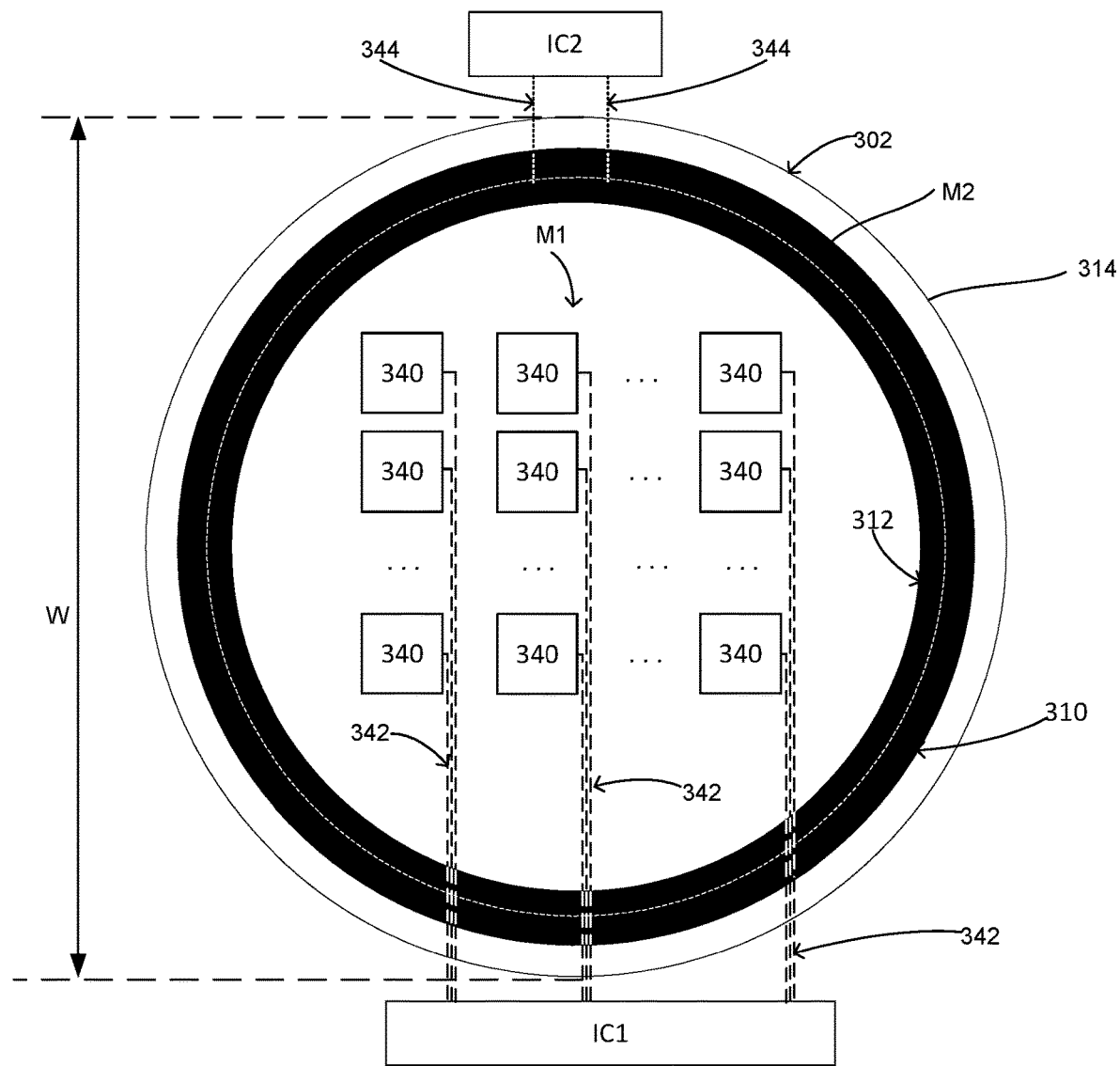
FIG. 3 is a top view of an example wearable electronic device with a stack of display components according to aspects of the disclosure.

FIG. 3 is a top down view of an example wearable electronic device with a stack of display components. For clarity purposes, not all components are shown. Additionally or alternatively, the components that are shown may be located in positions other than those shown. Therefore, the configuration of the wearable electronic device, as shown, is merely one example and is not intended to be limiting.

The first metal layer M1 may be a plurality of islands 340, or separate portions of metal, spread across a plane within the housing 302. For example, each of the plurality of islands 340 may be in the same horizontal plane. The horizontal plane may be parallel or substantially parallel to the first surface of the housing 302. As shown the islands 340 are square in shape. However, the islands 340 may be circular, rectangular, triangular, etc. and, therefore, the square shape is not intended to be limiting. The area of the housing 302 may be defined by the geometry of the display. As shown, the display and the housing 302 may be circular with a diameter "W." According to some examples, the horizontal plane may be the same or substantially similar to the cross sectional area of the housing 302 defined by perimeter 314. In some examples, the horizontal plane may be the area of the housing defined by the diameter "W."

Each island 340 of the first metal layer M1 is connected directly to the first integrated circuit chip IC1. The stack does not include a plurality of rows and columns of electrodes to connect first metal layer M1 to connect to an IC. Instead, there is a direct connection between each island 340 and the first integrated circuit chip IC1. The first integrated circuit chip IC1 is shown as outside the housing 302 for clarity purposes only as the first integrated circuit chip IC1 is intended to be within housing 302. A plurality of electrodes 342 may be routed through the first metal layer M1 to the first integrated circuit chip IC1. Each island 340 may have a respective electrode 342 coupling the island 340 directly to the first integrated circuit chip IC1.

The second metal layer M2 may extend along the perimeter 314 of the housing 302. According to some examples, the second metal layer M2 may be spaced apart from the perimeter 314 of housing 302. For example, the outer edge 310 of may be spaced a predetermined distance from the perimeter 314 of housing 302. The second metal layer M2 may extend between the outer edge 310 and the inner edge 312 of the second metal layer M2. The inner edge 312 may be closer to the center of the housing than the outer edge. As shown, the second metal layer M2 may look like a tube or coil around the perimeter. While the second metal layer M2 is shown as extending around the entire perimeter 314 of housing 302, the second metal layer M2 may extend partially around the perimeter 314 such that the second metal layer M2 does not create a full or complete loop. According to some examples, the second metal layer M2 may extend in a loop or a partial loop closer to the center of the wearable device than the perimeter.

The second metal layer M2 is directly connected to the second integrated circuit chip IC2. For example, instead of connecting the second metal layer M2 to the first metal layer M1, a second plurality of electrodes 344 may be routed around the perimeter of the housing to the second integrated circuit chip M2. That is, the second metal layer M2 may have separate circuitry from the first metal layer M1. While the first and second integrated circuit chips IC1, IC2 are shown as being positioned opposite one another, the first and second integrated circuit chips IC1, IC2 may be located at any position within housing 302. Therefore, having the first and second integrated circuit chips IC1, IC2 located opposite one another is merely one example and is not intended to be limiting.

The stack of components may include an insulation layer between the first metal layer M1 and the second metal layer M2. The insulation layer is not shown in FIG. 3 for clarity purposes. According to some examples, the insulation layer may be an inter-layer dielectric.

The first metal layer M1 may be a touch sensor and the second metal layer M2 may be an NFC antenna. The first integrated circuit chip IC1 may be a touch IC and the second integrated circuit chip IC2 may be an NFC IC.

Figure 4:
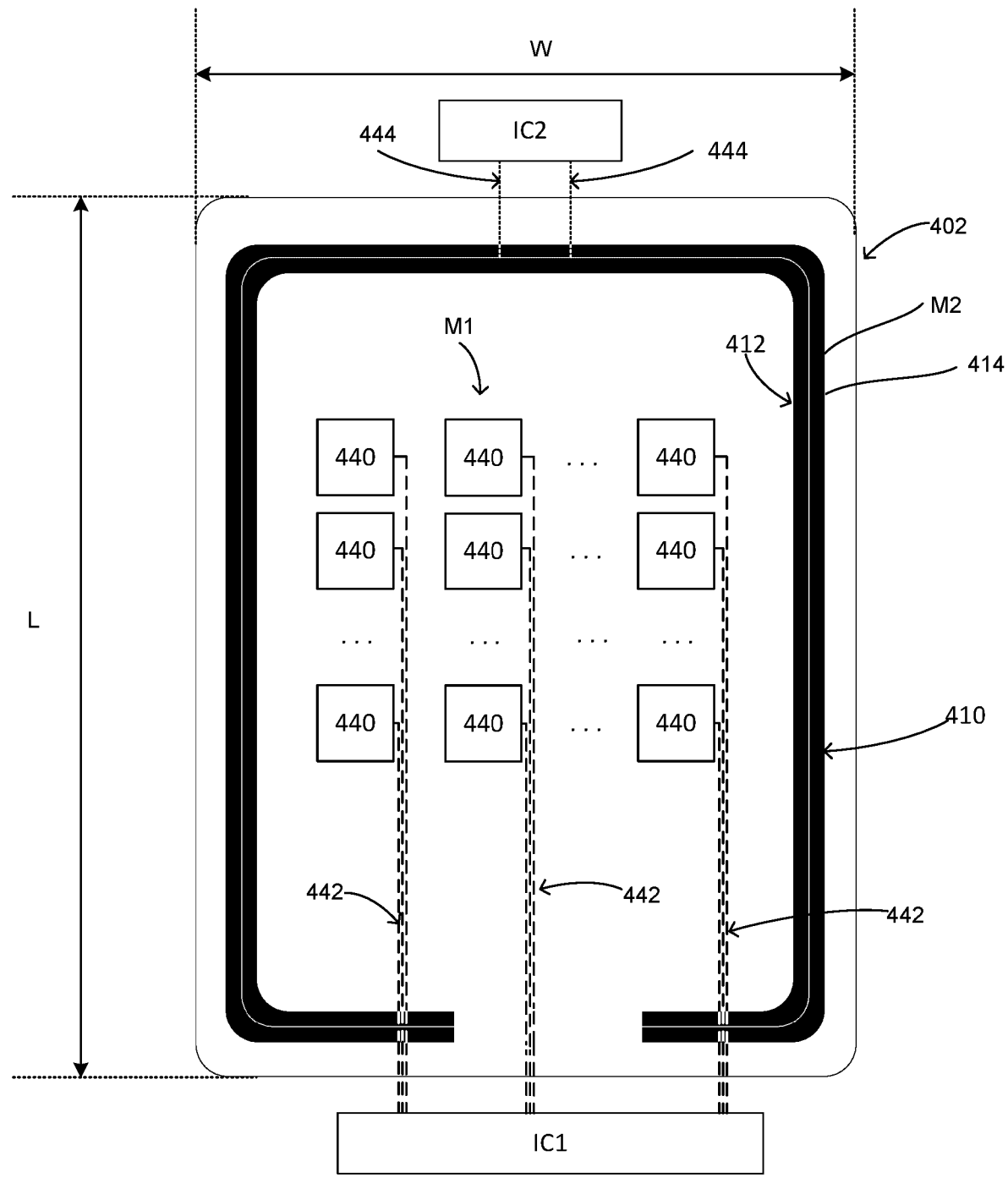
FIG. 4 is a top view of an example wearable electronic device with a stack of display components according to aspects of the disclosure.

FIG. 4 illustrates an example a top view of an example wearable electronic device with a stack of display components. For clarity purposes, not all components are shown. Additionally or alternatively, the components that are shown may be located in positions other than those shown. Therefore, the configuration of the wearable electronic device, as shown, is merely one example and is not intended to be limiting.

The components of the wearable device shown in FIG. 4 may be similar to those shown in FIG. 3 and, therefore, may have similar reference numbers. The wearable device may include a housing 402, defined by a perimeter 414 having a length "L" and a width "W," a first metal layer M1, a second metal layer M2, a first integrated circuit chip IC1 and a second integrated circuit chip IC2.

The first metal layer M1 may include a plurality of islands 440. While nine (9) islands 440 are shown, the first metal layer M1 may include any number of islands 440. The space between each island 440 may be more or less than the spacing shown in FIG. 4. For example, the spacing between islands 440 may be determined based on the number of islands 440 in the first metal layer 440. Additionally or alternatively, the shape of the island 440 may be any shape besides square, such as circular, triangular, etc. Thus, the position, size, shape, spacing, and number of islands 440 shown in FIG. 4 is merely one example and is not intended to be limiting. The islands 440 may be spread across a horizontal plane within housing 402. The horizontal plane may have an area defined by the length "L" and width "W" of the housing 402. Each island 440 may be coupled to the first integrated circuit chip IC1 via an electrode 442.

The second metal layer M2 may be defined by an outer edge 410 and an inner edge 412. The outer edge 410 and inner edge 412 may be spaced a distance such that the second metal layer M2 may create a coil around the perimeter 414 of housing 402. The second metal layer M2 does not extend around the entire perimeter 414. For example, the second metal layer M2 may extend partially around the perimeter 414 such that the second metal layer M2 is not a continuous loop. According to some examples, the second metal layer M2 may extend around the perimeter 414 more or less than what is shown in FIG. 4.

The second metal layer M2 may be directly connected to the second integrated circuit chip IC2 rather than being used to connect the islands 440 the first metal layer M1. For example, a second plurality of electrodes 444 may connect the second metal layer M2 directly to the second integrated circuit chip IC2. As shown, the electrodes 444 extend between the second metal layer M2 and second integrated circuit chip IC2. According to some examples, based on the location of second integrated circuit chip IC2, electrodes 444 may be routed around the perimeter 414 of housing 402 to connect the second metal layer M2 and the second integrated circuit chip IC2. In some examples, the electrodes 444 may be routed through the second metal layer M2.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A wearable electronic device, comprising:
    a housing having a cavity adapted to hold a plurality of components; and
    a stack of display components within the cavity, the stack including:
        a first metal layer extending at least partially across a width of the housing and coupled to a first integrated circuit chip;
        a second metal layer extending at least partially around a perimeter of the housing and coupled to a second integrated circuit chip, wherein the second metal layer is defined by an outer edge and an inner edge; and
        an insulation layer between the first metal layer and the second metal layer.

2. The wearable electronic device of claim 1, wherein the first metal layer is configured as a touch sensor.

3. The wearable electronic device of claim 1, wherein the second metal layer is configured as an antenna.

4. The wearable electronic device of claim 3, wherein the antenna is a near field communication antenna.

5. The wearable electronic device of claim 1, wherein the first metal layer is not directly electrically connected to the second metal layer.

6. The wearable electronic device of claim 5, wherein the first metal layer is a touch sensor and the second metal layer is a near field communication antenna, and wherein the touch sensor is coupled to a first plurality of electrodes and the near field communication antenna is coupled to a second plurality of electrodes.

7. The wearable electronic device of claim 6, wherein the first plurality of electrodes is routed through the first metal layer to the first integrated circuit chip and the second plurality of electrodes is routed around the perimeter of the housing to the second integrated circuit chip.

8. The wearable electronic device of claim 1, wherein the first integrated circuit chip is a touch integrated chip and the second integrated circuit chip is a near field communication chip.

9. The wearable electronic device of claim 1, wherein the display is an organic light-emitting diode ("OLED") display.

10. The wearable electronic device of claim 1 wherein the insulation layer is an inter-layer dielectric.

11. The wearable electronic device of claim 1, wherein the wearable electronic device is a smartwatch.

12. The wearable electronic device of claim 1, wherein the first metal layer comprises a plurality of islands.

13. The wearable device of claim 1, wherein the second metal layer forms a coil around the perimeter of the housing.

14. A stack of display components for an electronic device, comprising:
    a first metal layer defined by a perimeter, the first metal layer being configured as a touch sensor and coupled to a first integrated circuit chip; and
    a second metal layer configured as a near field communication antenna and coupled to a second integrated circuit chip,
    wherein the second metal layer is defined by an outer edge and an inner edge, the outer edge being aligned with the perimeter of the first metal layer, and
    wherein the first and second metal layers are separated by an insulation layer.

15. The stack of display components of claim 14, wherein the first integrated circuit chip is a touch integrated chip and the second integrated circuit chip is a near field communication chip.

16. The stack of display components of claim 15, wherein the touch sensor is coupled to a first plurality of electrodes and the near field communication antenna is coupled to a second plurality of electrodes.

17. The stack of display components of claim 16, wherein the first plurality of electrodes is routed through the first metal layer to the first integrated circuit chip and the second plurality of electrodes is routed around the perimeter of a housing of the electronic device to the second integrated circuit chip.

18. A stack of display components for an electronic device, comprising:
    a first metal layer including a plurality of islands, each island of the plurality of islands coupled to a first integrated circuit chip by one of a plurality of electrodes, wherein the electrodes are routed through the first metal layer;
    a second metal layer coupled to a second integrated circuit chip by one or more electrodes; and
    an insulation layer positioned between the first metal layer and the second metal layer.

19. The stack of display components of claim 18, wherein the first metal layer is configured as a touch sensor and the second metal layer is configured as a near field communication antenna.

20. The stack of display components of claim 18, wherein the insulation layer is an inter-layer dielectric.

* * * * *